(12) United States Patent
Cain et al.

(10) Patent No.: US 6,312,751 B1
(45) Date of Patent: Nov. 6, 2001

(54) EDIBLE FAT BASED FLAKES

(75) Inventors: Frederick William Cain; Bettina Schmidl, both of Wormerveer (NL); Gerald Patrick McNeill; Tony Herzing, both of Channahon, IL (US)

(73) Assignee: Unilever Patent Holdings, Vlaardingen (NL)

( * ) Notice: Subject to any disclaimer, the term of this patent is extended or adjusted under 35 U.S.C. 154(b) by 0 days.

(21) Appl. No.: 09/708,702

(22) Filed: Nov. 9, 2000

Related U.S. Application Data

(63) Continuation-in-part of application No. 09/440,842, filed on Nov. 16, 1999, now abandoned.

(51) Int. Cl.$^7$ .................................................. A23D 9/00
(52) U.S. Cl. ..................... 426/607; 426/555; 426/549; 426/560; 426/638; 426/640; 426/650
(58) Field of Search .................................. 426/555, 607, 426/560, 640, 549, 638, 650

(56) References Cited

U.S. PATENT DOCUMENTS

| | | | |
|---|---|---|---|
| 3,508,929 | 4/1970 | Callaghan | 426/555 |
| 3,589,914 | 6/1971 | Cooper | 426/560 |
| 3,892,880 | 7/1975 | Grolitsch | 426/555 |
| 4,045,588 | 8/1977 | Wieske | 426/607 |
| 4,343,826 | 8/1982 | McNaught | 426/601 |
| 4,360,534 | 11/1982 | Brabbs | 426/560 |
| 4,514,430 | 4/1985 | Hartman | 426/549 |
| 4,578,274 | 3/1986 | Suisawa | 426/96 |
| 4,645,673 | 2/1987 | Wilmes | 426/94 |
| 4,891,233 | 1/1990 | Belanger | 426/555 |
| 5,061,506 | 10/1991 | Leach | 426/607 |
| 5,064,670 | 11/1991 | Hershorn | 426/601 |
| 5,094,860 | 3/1992 | Newhall | 426/640 |
| 5,268,191 | 12/1993 | Crosby | 426/606 |
| 5,354,572 | 10/1994 | Miller | 426/580 |
| 5,356,643 | 10/1994 | Miller | 426/94 |
| 5,370,881 | 12/1994 | Fuisz | 426/5 |
| 5,374,445 | * 12/1994 | Havenstein | 426/603 |
| 5,431,945 | 7/1995 | Miller | 426/580 |
| 5,447,735 | 9/1995 | Miller | 426/285 |
| 5,667,837 | 9/1997 | Broomhead | 426/607 |
| 5,690,985 | 11/1997 | Van Meeteren | 426/607 |
| 5,846,592 | * 12/1998 | Alderliesten et al. | 426/602 |
| 5,888,575 | 3/1999 | Lansbergen | 426/607 |
| 5,895,675 | 4/1999 | Carment | 426/99 |
| 5,895,685 | * 4/1999 | Bodor | 426/602 |

FOREIGN PATENT DOCUMENTS

| | | |
|---|---|---|
| 2 176 143 A | 12/1986 | (GB) . |
| 0422714 | * 4/1991 | (GB) . |
| WO 94/24882 | 11/1994 | (WO) . |

* cited by examiner

*Primary Examiner*—Carolyn Paden
(74) *Attorney, Agent, or Firm*—Pillsbury Winthrop LLP

(57) ABSTRACT

Edible fat based flakes containing a flavouring system and displaying an excellent oral and textural properties comprise:

i) 0 to 2% moisture
ii) 25 to 90 wt % of a fat with a Stevens hardness at 25° C. of more than 65 g
iii) 0 to 15% of a flavouring system
iv) 0 to 40% of sugar
v) 0 to 60 wt % of a filler
vi) 0 to 60% of a health component while the total of components iii) to vi) is more than 8 wt % and which flakes have a size of 0.05 mm to 2.5 cm.

8 Claims, No Drawings

EDIBLE FAT BASED FLAKES

This is a Continuation-in-Part of: National Appln. No. 09/440,842 filed Nov. 16, 1999 now abandoned.

BACKGROUND OF THE INVENTION

Edible fat based, flavoured fat systems suitable for use in baked goods and snacks are known from U.S. Pat. No. 5,431,945 or U.S. Pat. No. 4,356,643 or U.S. Pat. No. 5,447,735. From these documents butter based flakes are disclosed in U.S. Pat. No. '945. These flakes are free of sugar and contain a lot of predried butter fat and high contents of dried milk solids. Particulars of the fats that can be applied are not given, all that is said about the nature of the fats, that can be applied is that they are related to butter fat. According to U.S. Pat. No. '643 cheese based flakes can be obtained along lines that are very similar to the lines set out above for U.S. Pat. No. '945. These flakes contain high levels of dried cheese solids while the fats that can be applied are the same or very similar to the fats according to above U.S. Pat. No. '945. According to U.S. Pat. No. '735 cinnamon based flakes can be obtained that contain large amounts of granulated sugar while the fat is again a butter fat or a fat closely related to butter fat.

GB 2 176 143 discloses fat flakes or fat granules, wherein the fat applied is selected from margarine, butter or lard (p.1,1.13–14). These flakes are used for cooking purposes and not as an ingredient for the preparation of bakery products, wherein the flakes must give a good flavour boost and must provide the bakery products with a good snap. As margarine and butter are fat emulsions containing about 20 wt % of water the use thereof in flakes that contain sugars is very limited because the sugars will be dissolved in the water phase of the fat emulsion and cannot contribute to the flavour boost nor to the snap of the products. Moreover the use of butter also has the drawbacks set out above. Lard is a fat that is relatively soft and thus has a low hardness therefore the use thereof in flakes will lead to unacceptable products U.S. Pat. No. 5,690,985 discloses liquid edible emulsion spreads wherein the fat phase contains high levels of liquid oils. Therefore these fats will be too soft for our purposes. In order to provide some structuring capacities to the fats 2 to 10 wt % of trans fat is added to the compositions. Thus this document is completely silent about fat flakes as we aim for whereas the fats that are disclosed are indicated for use in spreads only, which is a use that is completely different from our intended use.

U.S. Pat. No. 4,045,588 concerns with the use of fats with at least 40% polyunsaturated fatty acids in fats for margarines. Nothing is disclosed about the use of these fats in fat flakes for bakery applications that are supposed to provide a flavour boost and a snap. Moreover the fats according to this document have relatively high trans contents that we prefer to avoid.

We found that flakes with the composition as given above did not have a proper hardness leading to products when applied in baked bakery products with insufficient texture and oral mouthfeel, in particular to products that lacked snap and flavour boost, due to the poor flavour release of these flakes. Therefore we performed a study to find out whether we could find novel products wherein these insufficiencies were improved. Further we tried to find compositions that were easier to process than the known compositions.

SUMMARY OF THE INVENTION

This study resulted in our invention and this invention thus concerns in the first instance the finding of fats that meet a specific hardness criterium which enabled us to overcome the problems of the prior art. In particular we found novel edible fat based, flavoured fat systems suitable for use in baked goods and snacks comprising:

i) 0 to 2 wt % of moisture;

ii) 25 to 90 wt % of a bakery compatible fat having a Stevens hardness at 25° C. after storage at 25° C. for 4 hrs (=C25) of more than 65 g, preferably more then 70 g and having<5 wt % of polyunsaturated fatty acids with at least 3 double bonds or conjugated linoleic acid;

iii) 0 to 15 wt % of a flavouring system iv) 0 to 40 wt % of sugar v) 0 to 60 wt %, preferably 5 to 40 wt % of a filler material other than sugar vi) 0 to 50 wt %, preferably 0.5 to 45 wt % and most preferably 5 to 40 wt % of a health component, wherein the total of components iii) to vi) is more than 8 wt %, preferably 8 to 75 wt % and which edible fat based system has a particle size between 0.05 mm and 2.5 cm.

DESCRIPTION OF THE PREFERRED EMBODIMENTS

The Stevens hardness is measured using the following method:

1. take a sample of 100 g fat and melt it in beaker at 50° C.
2. place the beaker in a water bath at 15° C. and stir continuously until too thick
3. place beaker in water bath at 35° C. and stir until 30 just pourable
4. pour fat in a petri dish and cool at 15° C. for 30 minutes
5. place petri dish at 25° C. and measure Stevens hardness, using a Stevens. LFRA Texture Analyser (Mechtric/Stevens) provided with a load cell of 0–1000 g and a needle ASTM D-5, after 4 hours.
6. use a needle speed of 0.5 mm/sec and a distance of 4 mm.

It was unexpected that fats that have relatively low N25 values gave such good results because it should have been expected that these fats would result in low hardness values and thus in insufficient textural properties.

Flavouring systems that can be applied in our novel flakes can be selected from the group consisting of the natural flavour components from fruit, like oranges, strawberries, raspberries, blueberries, goose berries, redberries, blackberries, apples, pears, peaches, apricots, cherries, from nuts, like walnuts, hazelnuts, macadamia's, groundnuts, from herbs or spices like cinnamon, ginger, nutmeg, cloves, allspice, from maple sugar or dehydrated maple syrup, from garlic or onions, from butter or cheese, from savory flavours such as savory culinary aids, from synthetic flavour components imitating above natural flavours, and from mixtures thereof.

These flavouring systems can now be applied in any form, including forms that are excluded by U.S. Pat. No. '735, wherein the flavour must be a particulated solid. The flavours that can be applied now can be used in a form selected from the group consisting of: finely devided solid flavours; finely divided solid or liquid flavours on a solid carrier, liquid flavours and microcapsules containing a solid, or liquid, or gaseous flavour.

The fats that lead to the beneficial results indicated above are different from or dissimilar to butter fat and can be selected from the group consisting of: natural or hardened glycerides based on C12+ fatty acids such as cocoa butter, soybean oil, cotton seed oil, groundnut oil, rapeseed oil, sunflower oil, corn oil, palm oil, shea oil, illipe fat, palm kernel oil, coconut oil or fractions or blends thereof and preferably having a content of less than 5 wt % trans acids. However only those fats that meet the hardness criterium mentioned above will give the desired benefits.

The filler is used to structure the flakes while not attributing to much to its caloric content. Suitable filler materials are dried particulated ingredients preferably selected from the group consisting of flour, skim milk powder, butter milk powder, starches, polysaccharides other than sugar, gums, whey powder, cellulose and hydrocolloids.

Nowadays consumers are more and more interested in products that are healthy and in particular in foods that contain health components. However this has as a consequence that also the fats applied in these foods must be healthy and this thus means that in particular partially hardened fats i.e fats with a relatively high trans fatty acid content, which are known to give structuring to food products but that are considered as unhealthy fats, can not be applied in these foods. Therefore it was highly unexpected that such health foods could be obtained without the need to use such partially hardened fats.

Because of the fats that we apply in our novel flakes it is possible now to make healthy food products that contain a healthy fat component and simultaneously incorporate a health component in the flakes in amounts that is effective to benefit from its presence in the flakes. The health component remains homogeneously distributed in the flakes and can be selected from olives, grapes, grape fruit, paprika, garlic, tomatoes, oranges, lemons, berries, nuts, in particular in the form of particulated fruit skins of olives, grapes, grape fruit, tomatoes, paprika, or particulated garlic, onions, herbs or spices.

In addition to these components also other health components can be present such as vitamines and minerals. Herefore all well known vitamines and minerals can be applied. Some of these components are present in milk or cheese components or in other natural products that could be added as well.

According to another embodiment of our invention our novel flakes can be prepared by a process wherein 1. the fat applied is molten to about 45 to 60° C.
2. the dry ingredients are incoporated in the molten fat until a homogeneous mixture is obtained
3. this mixture is transferred to a holding tank where it is agitated continuously for some hours at a temperature of about 25 to 45° C.
4. the mixture is then cooled in a tempering unit to 15 to 25° C.
5. the cooled mixture is deposited in a thin layer onto a moving belt
6. the moving belt is passed through a cooling tunnel and the layer of fat is cooled to a temperature of about 0 to 5° C. using a residence time of about 2 to 15 minutes
7. the cooled (solid) mixture is broken into discrete particles with the required particle size
8. the broken particles can then be packed According to a last embodiment our invention also concerns the bakery or snack products containing the edible fat based system according to the invention.

EXAMPLES 1–6

In the following examples the fats as tabulated below are applied:

| Ex nr | Fat applied | N25 | Stevens at 25° C. after 4 hr |
|---|---|---|---|
| 1* | Hydrogenated mid faction of mixture of soybean oil and cotton seed oil | 67 | 51 |
| 2* | Hydrogenated palm oil fraction | 58 | 36 |
| 3* | Hydrogenated and fractionated biend of soybean oil and palm oil | 51 | 59 |
| 4 | Blend of palm mid and shea stearine | 63 | 88 |
| 5 | Shea stearine | 87 | 199 |
| 6 | Palm mid fraction | 61 | 85 |

*comparative examples

Above fats are applied in the following formulations:

| Formulation 1 | Wt % | Formulation 2 | Wt % |
|---|---|---|---|
| Fat | 45 | Fat | 45 |
| Sugar | 19 | Sugar | 19 |
| Flour | 15 | Flour | 15 |
| Paprika | 4 | Conc grape flavour | 0.3 |
| Dried tomato extract | 8 | Dried grape extract | 11 |
| Dried olive oil extract | 8 | Dried grapefruit extract | 9.7 |
| Organo | 1 | | |

The following procedure is applied: 550 gram of dry ingredients are dispersed into 450 g of molten fat at 48° C. and a homogeneous mixture is made. This mixture is pumped into an agitated holding tank and is held on 41° C. for 1 hour. The mixture obtained is pumped into a tempering vessel wherein it is agitated for 2.5 hours at 29.5° C. The cooled mixture is deposited on to a moving belt as a thin layer and the belt is passed through a cooling tunnel at temperature of 6° C. for 5 minutes. The mixture on the belt solidifies and is broken into dry flakes of about 1 cm. The flakes are packed into containers.

When using formulation 2 some minor changes are applied ie 20 The starting temperature of the mixture is 45° C. The mixture is kept in a holding tank at 40° C. for 2 hrs The mixture is kept in the tempering unit for 3 hrs at 28° C.

And the mixture is cooled on the belt at 5° C. for 6 minutes

Results:

With fats 1 to 3 the flakes in both formulations are too soft and do not have a good hardness and texture. The flakes stick together when stored at 20° C. With fats 4 to 6 in both formulations the flakes have good hardness and texture and do not stick together when stored at 20° C. Moreover the flakes with fats 4 to 6 display good oral melt down and flavour release when applied in bakery products.

COMPARATIVE EXAMPLES 7 and 8

The first procedure of examples 1–6 was applied on the following formulations 3 and 4:

Formulations 3 and 4

| Formulation 3 | wt % | Formulation 4 | wt % |
|---|---|---|---|
| sugar | 34.9 | lard | 30.0 |
| granular sugar | 17.0 | granular sugar | 11.0 |
| pastry flour | 15.9 | icing sugar | 18.6 |
| flavour | 2.20 | soy IF (1) | 22.0 |
| lard | 30.0 | ground cinnamon (2) | 9.0 |
| colourant | trace | cinnamon flavour (3) | 12.0 |
| | | Ca CO3 | 6.1 |
| | | MgO | 1.3 |

(1) soylife complex micro 54x/499/M
(2) McCormick
(3) Givaudan R: Spice N'Eary Cinnamon #810289

The flakes obtained had insufficient quality. They were too soft at roomtemperature. Even when cut at −20° C. the flakes were too soft. At room temperature the flakes fused into one mass.

EXAMPLES 9 and 10

The same procedure was also applied on the following formulations 5 and 6:

| Formulation 5 | wt % | Formulation 6 | wt % |
|---|---|---|---|
| SHS-fat | 40.0 | SHS/PO-m 75/25 | 36.3 |
| flour | 35.0 | grapefruit powder (4) | 18.2 |
| tomato powder (1) | 16.0 | icing sugar | 18.2 |
| olive powder (2) | 8.0 | granular sugar | 13.6 |
| oregano powder (3) | 1.0 | flour | 13.6 |
| | | colourant | trace |

SHS = shea-stearin
(1) from LycoRed LRTP Powder (lot 010011: 1.11% lycopene)
(2) Van Drunen Farms (lot 26394160218.4)
(3) Van Drunen Farms: Air dried oregano (lot 03493394683.4)
(4) Van Drunen Farms: Freeze dried - 6o grapefruit powder (lot 1469021840.2)

The products obtained were excellent, had a good flavour boost and good snap.

What is claimed is:

1. Edible fat based, flavoured fat system suitable for use in baked goods and snacks comprising:
   i) 0 to 2 wt % of moisture;
   ii) 25 to 90 wt % of a bakery compatible fat having a Stevens hardness at 25° C. after storage at 25° C. for 4 hrs (=C25) of more than 65 g, and having <5 wt % of polyunsaturated fatty acids with at least 3 double bonds or conjugated linoleic acid;
   iii) 0 to 15 wt % of a flavouring system
   iv) 0 to 40 wt % of sugar
   v) 0 to 60 wt %, of a filler material other than sugar
   vi) 0 to 50 wt %, of a health component, wherein the total of components iii) to vi) is more than 8 wt %, and which edible fat based system has a particle size between 0.05 mm and 2.5 cm.

2. Edible fat based fat system according to claim 1 wherein the fat component has a trans fatty acid content of less than 5 wt %.

3. Edible fat based fat system according to claim 1, wherein the flavouring system is selected from the group consisting of the natural flavour components from fruit, oranges, strawberries, raspberries, blueberries, goose berries, redberries, blackberries, apples, pears, peaches, apricots, cherries, from nuts, walnuts, hazelnuts, macadamia's, groundnuts, from herbs or spices, cinnamon, ginger, nutmeg, cloves, allspice, from maple sugar or dehydrated maple syrup, from garlic or onions, from butter or cheese, from savory flavors, from synthetic flavour components imitating above natural flavours, and from mixtures thereof.

4. Edible fat based fat system according to claim 3 wherein the flavour components are selected from the group consisting of: finely divided solid flavours; finely divided solid or liquid flavours on a solid carrier, liquid flavours and microcapsules containing a solid, or liquid, or gaseous flavour.

5. Edible fat based fat system according to claim 1 wherein the bakery compatible fat is selected from the group consisting of: natural or hardened glycerides based on C12+ fatty acids such as cocoa butter, soybean oil, cottonseed oil, groundnut oil, rapeseed oil, sunflower oil, corn oil, palm oil, shea oil, illipe fat, palm kernel oil, coconut oil or fractions or blends thereof.

6. Edible fat based fat system according to claim 1 wherein the filler is a dried particulated ingredient selected from the group consisting of flour, skim milk powder, butter milk powder, starches, polysaccharides other than sugar, gums, whey powder, cellulose and hydrocolloids.

7. Edible fat based fat systems according to claim 1 wherein the health component is selected from the group consisting of olives, grapes, grape fruit, paprika, garlic, tomatoes, oranges, lemons, berries, nuts, particulated fruit skins of olives, grapes, grape fruit, tomatoes, paprika, or particulated garlic, onions, herbs or spices.

8. Bakery or snack products containing the edible fat based system according to any of claims 1 to 7.

* * * * *